United States Patent [19]

Heidrich et al.

[11] Patent Number: 4,856,094
[45] Date of Patent: Aug. 8, 1989

[54] ARRANGEMENT FOR POLARIZATION CONTROL, SUCH AS FOR AN OPTICAL HETERODYNE OR HOMODYNE RECEIVER

[75] Inventors: Helmut Heidrich; Detlef Hoffmann; Hans-Peter Nolting, all of Berlin, Fed. Rep. of Germany

[73] Assignee: Siemens Aktiengesellschaft, Berlin and Munich, Fed. Rep. of Germany

[21] Appl. No.: 95,270

[22] Filed: Sep. 11, 1987

[30] Foreign Application Priority Data

Sep. 18, 1986 [DE] Fed. Rep. of Germany ....... 3631767

[51] Int. Cl.$^4$ .............................................. H04B 9/00
[52] U.S. Cl. ................................. 455/619; 350/96.13; 350/378; 350/389; 350/403; 350/405; 350/387; 455/612; 455/616
[58] Field of Search ............... 455/612, 617, 616, 619; 370/2; 350/96.11, 96.13, 96.15, 378, 389, 400, 403, 405, 407, 374, 387, 392, 401, 96.14

[56] References Cited

U.S. PATENT DOCUMENTS 4,752,120 6/1988 Shimizj ................................ 455/616

FOREIGN PATENT DOCUMENTS

86P8019 3/1986 Fed. Rep. of Germany .
86P8027 5/1986 Fed. Rep. of Germany .
0144699 1/1986 Japan ................................... 455/619

OTHER PUBLICATIONS

Rysdale, "Method of Overcoming Finite-Range Limitations of Certain State of Polarization Control Devices in Automatic Polarization Control Schemes", Electronic Letters, vol. 22, #2, 1-16-86, pp. 100-102.
Article "Temperature Tuning of LiNbO Electro-Optic Waveguide TE/TM Mode Converters" pp. 1045-1047 of Electronics Letters of 6 Dec. 1984, vol. 25/26.
"Electro-Optic Waveguide TE-TM Mode Converter With Load Drive Voltage" by Alferness et al, Optics Letters, No. 1980, vol. 5, No. 11, pp. 476-475.
"Wavelength Independent Optical Damage Immune LiNbO$_3$ TE-TM Mode Converter" by Thaniyavarn, Jan. 1986, vol. 11, No. 1, Optics Letters.
"Wavelength Independent Optical Damage Immune Z Propagation LiNbO$_3$ Waveguide Polarization Converter" by Thaniyavarn pp. 674-677, Applied Physics Letters 37, Oct. 1, 1985.
"A Simple And Wideband Width TE/TM Converter Using Z Propagating LiNbO$_3$ Waveguides" by Mariller et al, pp. 174-176, Third European Conferences ECIO '85, Berlin Springer Series in Optical Sciences 48.
"Electro-Optic Guided Wave Device For General Polarization Transformation" by Alferness, pp. 965-969, IEEE Journal of Quantum Electronics, vol. QE17, No. 6 of Jun. 1981.

Primary Examiner—Benedict V. Safourek
Assistant Examiner—Leslie Van Beek

[57] ABSTRACT

An arrangement for polarization control for an optical heterodyne or homodyne receiver wherein the state of polarization of the optical signal of the local oscillator of a heterodyne or homodyne receiver and the optical signal supplied to the receiver can be transformed so that both signals can be adjusted to the same identical state of polarization. A phase modulator PM1 and a following polarization converter PK1 are arranged onto an optical waveguide WL1 which receives at an input $e_1$ an optical wave from a subscriber and another polarization converter PK2 and a following phase modulator PM2 are arranged onto another optical waveguide WL2 which has an input $e_2$ for coupling in the local oscillator signal. The arrangement can be controlled such that the signals fed in have the same state of polarization at the output for superposition and IF generation.

7 Claims, 2 Drawing Sheets

ARRANGEMENT FOR POLARIZATION CONTROL, SUCH AS FOR AN OPTICAL HETERODYNE OR HOMODYNE RECEIVER

BACKGROUND OF THE INVENTION

1. Field of the Invention

This invention relates to polarization control such as for an optical heterodyne or homodyne receiver wherein an optical waveguide WL1 receives at an input $e_l$ for coupling an elliptically polarized optical wave Tln transmitted by a subscriber and includes a phase modulator PM1 mounted to a first waveguide WL1 so as to continuously vary the preparation conditions of the signal in the first waveguide WL1 and a polarization converter PK1 follows the first phase modulator PM1 and another optical waveguide WL2 which receives an input signal $e_2$ for coupling a linearly polarized optical wave supplied by a local oscillator LO and another polarization converter PK2 and another phase modulator PM2 following the second polarization converter PK2 so as to vary the phase in the second waveguide WL2 and to yield the same states of polarization of either optical waves.

2. Description of the Prior Art

German Patent Application No. P 36 10 573.2 (VPA No. 86 P 8019 DE) and an article by Reinhald Noe entitled "Endless Polarization Control For Heterodyne/Homodyne Receiver", Fiber Optic 86, London, April/May 1986 disclose five birefringent elements comprising three-phase modulators and two polarization converters which are alternately arranged along an optical waveguide. Every polarization condition at the input side can be converted without restriction to any arbitrarily desired polarization condition with such arrangement. "Unrestricted" means that a continuous ongoing polarization adaptation to an arbitrarily desired or prescribed polarization condition is assured without a functional polarization resetting when limits of the control variable are reached.

There is a problem of matching the state of polarization ("SOP") in optical heterodyne or homodyne receivers. Following in the specification the abbreviation "SOP" is used for "state of polarization". The polarization of the optical signal supplied to the receiver must be matched to the SOP of the optical signal of a local oscillator of the receiver. The signal of the local oscillator is generally linearly polarized, but the signal supplied to the receiver can assume any arbitrary SOP. So as to bring the SOPs of both signals into agreement, either the SOP of the signal supplied to the receiver must be transformed into the same linear polarization condition of the signal of the local oscillator in a polarization stabilization stage and then be kept constant in time or the SOP of the signal of the local oscillator is to be changed to the SOP of the signal supplied to the receiver which can continuously change. These two alternative solutions can be accomplished with an arrangement discussed by the article by Noe listed above.

In the first alternative, the SOP at the output of the arrangement is fixed whereas the polarization in the second alternative arrangement is fixed at the input of the arrangement. In such arrangements according to Noe, a phase modulator can be omitted so that only four birefringent elements are required.

The embodiment of the arrangement discussed in the article by Noe is a fiber optical realization wherein the birefringences are generated by exerting an external squeeze onto the waveguiding fibers which form the waveguides. Since it requires only two different birefringent elements, it should according to the article by Noe facilitate an integrated optical structure.

The earlier German Patent Application No. P 36 15 982.4 (VPA No. 86 P 8027 DE) proposes a fiber optical arrangement comprising only three birefringent elements, two phase modulators and a polarization converter which is controllable such that no abrupt change of the polarization results even when any of the elements has reached a limit of its control range. An integrated optical arrangement which is similar to the apparatus described in German Patent Application No. P 36 15 982.4 is described in an article by Alferness, R. C. entitled "Electro-Optic Guided-Wave Device For General Polarization Transformation" IEEE Journal Quant. Electr. QE-17 (1981), Pages 965-969. In this arrangement, the three existing elements, two electro-optically induced, birefringent phase modulators and a polarization converter are arranged in an alternate form along an optical waveguide integrated in a substrate of electro-optical material. In the specific embodiment of this arrangement described therein, the optical waveguide is composed of a Ti diffused lithium niobate waveguide extending in the y-direction which proceeds at the surface of a x cut lithium niobate crystal. Every phase modulator is realized by an electrode pair for applying a control voltage arranged on both sides of the waveguide and applied to the surface of the crystal. The polarization converter is composed of a series of electrodes, arranged transversely over the waveguide for generating vertical electrical fields in the waveguide which periodically change along the waveguide.

An arbitrary SOP can also be converted into another arbitrary SOP with such an arrangement. This system is suitable for stabilization of the SOP of a signal received from a fiber particularly for the stabilization of an elliptically polarized signal typically received from a monomode fiber into a linearly polarized signal.

With this prior art arrangement, an unrestricted continuous polarization matching assuming ongoing polarization drift is not possible and resetting is required when a certain limit of the control range has occurred. The polarization converter utilized in the specific embodiment described in the article by Alferness and the entire embodiment has an optical bandwidth of about 2 nm and are therefore unsuitable for use in an optical communication transmission system and, thus, are also unsuitable in an optical heterodyne or homodyne receiver See also the article by Booth, R. C., Daymont-John B. E., Sturges P. E., Wilson, M. G. entitled "Temperature Curing of $LiNbO_3$ Electro-Optic Waveguide TE/TM Mode Converters", Electron. Lett. 20 (1984), Pages 1045-1047.

For such use, such an arrangement must be optically broadband that it fulfills the function for the desired wavelength region, for example, 1300±25 nm and no temperature stabilization and electrical wavelength region corrections are necessary.

An article by Thaniyavarn, S., entitled "Wavelength Independent, Optical Damage-Immune Z-Propagation $LiNbO_3$ Waveguide Polarization Converter", in Application Phys. Letter 47 (1985) pages 674-677 and the article by Thaniyavarn, S., entitled "Wavelength Independent, Optical Damage-Immune $LiNbO_3$ TE-TM Mode Converter", Optics lett. 11 (1986), Pages 39-41, disclose a broadband electro-optically induced, birefringent polarization converter integrated on a substrate of electro-optical material wherein a TI-defused lithium niobate waveguide is arranged on the surface of a x-cut lithium niobate crystal in the z-direction and wherein three electrodes extending in the longitudinal direction of the waveguide i.e. in z-direction are applied on the surface of the crystal. Two of these electrodes are arranged on either side of the waveguide and the third electrode is arranged between the other two ones above the waveguide. By applying three suitable voltages to these electrodes, an electro-optically induced matching of the effective refractive indices for TE-polarized and TM-polarized optical waves can be achieved which allows a nearly 100% conversion. The article by Mariller, C., Papuchon, M. entitled "A Simple and Wide Optical Bandwidth TE/TM Converter Using Z Propagating $LiNbO_3$ Waveguides", Proc. 3rd European Conference, ECIO 1985 Berlin, Springer Series in Optical Sciences 48 (H.-P. Nolting, R. Ulrich Editors), Pages 174–176 discloses an integrated optically broadband polarization converter which differs from the converter of Thaniyavarn only in that it utilizes a y-cut crystal which requires a horizontal field transversely to the waveguide for the TE/TM conversion and wherein the third electrode over the waveguide is missing and therefore the degree of freedom with respect to the optically induced matching of the effective refractive indices is lacking.

SUMMARY OF THE INVENTION

It is an object of the present invention to provide an arrangement for polarization control which operates unrestrictedly in the sense defined above such that both the SOP of the optical signal of the local oscillator of a heterodyne or homodyne receiver as well as that of the optical signal supplied to the receiver can be transformed such that subsequently, both signals can be matched or superposed with an arbitrary but identical SOP.

It is a feature of the invention to provide a combination of phase modulators and polarization converters onto a pair of optical waveguides to accomplish the desired results.

In the solution according to the invention, polarization of the signal supplied to the receiver can be continuously changed and it is to be coupled into a first waveguide and the signal of the local oscillator which has a fixed polarization condition is coupled into a second waveguide. Two signals which have the same but arbitrary polarization can be obtained from the two waveguides at the output of the arrangement, in other words, at the output side of the one polarization converter PK1 or, respectively, at the other phase modulator PM2.

The function of the arrangement of the invention is described as follows: If the two waveguides WL1 and WL2 at the output side of the arrangement, in other words, at the site the end of the first polarization converter PK1 or, respectively, of the other second modulation PM2 on the side away from the input $e_1$ or, respectively, $e_2$ would be connected to one another so that a signal which is coupled in at the inputs $e_1$ of the first waveguide WL1 or, respectively, at the input $e_2$ of the second waveguide WL2, would be fed to the input $e_2$ or $e_1$, respectively, then it would be possible to obtain an arrangement for polarization control of the type described in the Noe article which operates in an unrestricted fashion and comprises four birefringent elements which are sufficient because of the polarization condition of the local oscillator is linear in TE or TM modes.

The arrangement can then be controlled in the scope of the type of the article by Noe such that any arbitrary SOP at the input $e_1$ is transformed into TE or, respectively TM polarization after passing through the arrangement and the TE or TM SOP is capable of being obtained at the input $e_2$. Since the arrangement described in the article by Noe is an optically reciprocal component, the TE or, respectively, TM SOP coupled in at the input $e_2$ would be transformed into the arbitrary SOP which can continuously change and which could be taken at the input $e_1$. After a signal has traversed, one half of the arrangement of that described in the article by Noe controlled in the above fashion, in other words, after passing the first phase modulator PM1 and the first polarization converter PK1, a signal coupled in at the inputs $e_1$ having an arbitrary SOP is defined as a SOP P. Since the arrangement is optically reciprocal, a signal having the TE or, respectively, the TM SOP which is coupled in at the input $e_2$ and passes through the arrangement in the opposite direction must also have the defined polarization condition P after travelling through half of the arrangement controlled in the fashion described above, in other words, after travelling through the second polarization converter PK2 and the second phase modulator PM2. This is true regardless of whether the two waveguides WL1 and WL2 are connected to each other at the output side of the arrangement or not. The same polarization condition appears at the output side of the arrangement both at the first waveguide WL1 as well as at the second waveguide WL2.

The invention also encompasses improvement which corresponds to the scope of an arrangement of the article by Noe which has five birefringent elements. In this embodiment, the SOP of the signal coupled into the second waveguide WL2 need not be polarized in the TE or TM mode, it can be arbitrary. With such improvement, two optical signals each having an arbitrary SOP can be transformed such that subsequent both signals have an arbitrary, but identical polarization condition at the output side of the apparatus. For this purpose, the improvement is to control in sense and scope to the corresponding arrangement of the equipment described in the article by Noe which comprises five birefringent elements controlled such that the arbitrary SOP of the first signal is converted into the arbitrary SOP of the second signal and vice versa.

In a heterodyne or homodyne receiver usually the signals to be superposed must have identical SOPs. Thus, it is expedient to use an optical directional coupler having controllable coupling ratio in order to establish an optimum coupling ratio.

Another especially advantageous development is to provide electro-optically induced elliptically refractive index axes which can be generated at the angle of 0° relative to the normal of the crystal surface with phase modulators and electro-optically induced elliptically refractive index axis at the angle of 45° relative to the normal of the crystal which can be generated with polarization converters. The phase modulators and polarization converters formed in this manner may correspond in detail to the phase modulators and polarization converters of those describe in the articles by Thaniyavarn. Adequate optically broadband function can be obtained with such arrangement.

A further advantage may be obtained when the coupling means or the directional coupler are integrated on the same substrate.

An arrangement of the invention and an improvement comprises an integrated structure on a substrate of electrooptical material wherein the substrate normal or crystal normal is aligned parallel to the x axis.

The feature of the invention is that a very short structural arrangement results.

The present invention also comprises an integrated optical embodiment functioning in principle as described in the article by Noe which has four or five birefringent elements. An arrangement according to the invention has an advantage that an adequate broadband behaviour is obtained and the phase modulators and polarization converters are integrated in a common substrate such that space saving structure is obtained. A birefringence is electro-optically generated having a refractive index axis at an angle of 0° relative to the normal of the crystal surface bu the two or three phase modulators. However, a birefringence having a refractive index axis at an angle of 45° relative to the normal of the crystal surface can be generated by each of with the two polarization converters.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
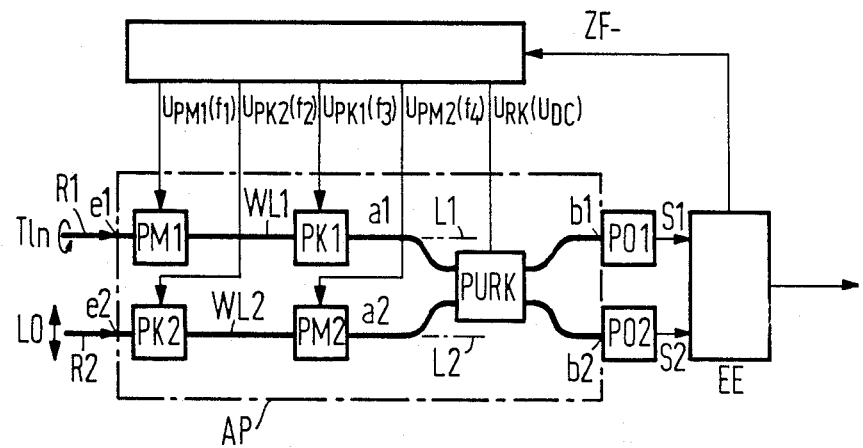
FIG. 1 illustrates an arrangement having two optical waveguides, two phase modulators, two polarization converters and a polarization independent directional coupler and, shown as a block circuit diagram, an electronic device besides for controlling the arrangement for heterodyne or homodyne receivers.

FIG. 1 illustrates an arrangement AP suitable for a heterodyne or homodyne receiver wherein the optical wave transmitted by subscriber Tln and to be supplied to the receiver, not shown, is coupled into a first waveguide WL1 of the arrangement AP by way of the input $e_1$. In the general case, this optical wave is supplied by way of a standard monomode fiber and is usually elliptically polarized. A phase-modulator PM1 receives the incoming signal and provides a continuously variable birefringence in the first waveguide WL1 by which the phase of the incoming subscriber signal in waveguide WL1 can be continuously varied. Relative to the propagation direction R1 of the incoming signal guided through the first waveguide WL1, the first phase modulator PM1 supplies its output to a first polarization converter PK1 wherein a continuously variable birefringence is induced in the waveguide WL1 and a SOP which is orthogonal relative to the SOP of the incoming signal in the first waveguide WL1 can be generated. The elliptical refractive index axis of the birefringence induced by the first phase modulator PM1 is aligned perpendicular in a known manner to the longitudinal axis L1 of the first waveguide WL1 relative to the propagation direction R1. The elliptical refractive index axis of the birefringence induced by the first polarization converter PK1 which is also perpendicular to the longitudinal axis L1 of the first waveguide is rotated by 45° around the longitudinal axis L1 of the first waveguide WL1 as compared to the elliptical refractive index axis of the first phase modulator PM1.

An optical wave generated by a local oscillator LO not shown, of the receiver which comprises the linearly polarized TE or the TM mode and, thus, a fixed SOP is coupled into a second waveguide WL2 which is arranged parallel to the first waveguide WL1 and this optical wave is supplied to the input $e_2$ of the second waveguide WL2.

A continuously variable birefringence can be induced in the second waveguide WL2 with a second polarization converter PK2 and a SOP which is orthogonal relative to the fixed SOP of the incoming local oscillator optical wave LO can be generated.

Relative to the propagation direction R2 of the local oscillator optical wave LO passing in the second waveguide WL2, the second polarization converter PK2 supplies its output to a second phase modulator PM2 to cause a continuously variable birefringence which is induced in the second waveguide WL2 and as a result, the phase of the local oscillator optical wave LO passing in the second waveguide WL2 can be continuously varied.

The elliptical refractive index axis of the birefringence induced by the second phase modulator PM2 is aligned such that it passes parallel to the elliptical refractive index axis of the first phase modulator PM1. The elliptical refractive index axis of the birefringence induced by the second polarization converter PK2 is rotated by an angle of 45° around the longitudinal axis L2 of the second waveguide WL2 relative to the propagation direction. The polarization of the optical wave is rotated relative to the elliptical refractive index of the second phase modulator PM2, for example, such that it passes parallel to the elliptical refractive index axis of the first polarization converter PK1.

The inputs ports $e_1$ and $e_2$ of the two waveguides WL1 and WL2 can be real ports, for example, end faces of the waveguides WL1 and WL2 through which the signals are coupled in. However, they need not be real ports but can also merely define a boundary of the arrangement AP. For example, in a fiber optical embodiment of the arrangement AP, one fiber supplying the subscriber signal can extend through and up to the outside end of the arrangement AP so that the first waveguide WL1 would be a part of the subscriber line which part extends only from the location $e_1$ up to the output end.

A polarization independent directional coupler PURK which has coupling conditions which are controllable so that it can be optimally matched to the particular conditions, for example, can be formed as an exact 3 dB coupler is arranged at the output side of the arrangement AP, in other words, at the output of the first polarization converter PK1 and the output side of the second phase modulator PM2 as shown.

The optical wave transmitted by the subscriber Tln which is at the output of the first polarization converter PK1 is supplied to an input $a_1$ of the directional coupler PURK and the local oscillator optical wave LO which occurs at the output of the second phase modulator PM2 and which local oscillator optical wave LO has the same SOP as the optical wave transmitted by the subscriber Tln supplied to the input $a_1$ assuming proper control of the arrangement AP is supplied to another input $a_2$ of the directional coupler PURK. These optical waves are superposed in the directional coupler PURK.

The output signals of the directional coupler occur at a first output $b_1$ or at a second output $b_2$ and, are respectively supplied to a first photodetector PD1 or to a second photodetector PD2. In an optional arrangement photodetectors PD1 and PD2 can be operated in push pull and can be provided at each of the outputs $b_1$ and $b_2$ of the directional coupler PURK.

The output electrical signal S1 of the photodetector PD1 and or, respectively, the output electrical signal S2 of the photodetector PD2 are supplied to an electrical unit EE in which an IF signal is generated from the supplied signals. The IF signal is supplied to an intelligent polarization control unit IP which produces sweep frequencies $f_1$, $f_2$, $f_3$ and $f_4$. Signal $f_1$ is supplied to the phase modulator PM1. The signal $f_2$ is supplied to the polarization converter PK2. The signal $f_3$ is supplied to the polarization converter PK1 and the signal $f_4$ is supplied to the phase modulator PM2. The frequency $f_1$ through $f_4$ are utilized to generate control voltages $U_{PM1}(f_1)$, $U_{PK2}(f_2)$, $U_{PK1}(f_3)$ and $U_{PM2}(f_4)$ which are respectively supplied to the first phase modulator PM1, to the second polarization converter PK2, to the first polarization converter PK1, and to the second phase modulator PM2 so as to control such elements. Also, the polarization control unit IP generates a voltage signal $U_{RK}(U_{DC})$ which depends on a DC voltage $U_{DC}$ which controls the coupling ratio of the directional coupler PURK. The SOP of the transient response and for the operation of the arrangement AP are identified in the polarization control unit IP on the basis of the sweep frequency $f_1$, $f_2$, $f_3$ and $f_4$ representing control variables of the individual birefringent elements PM1, PK2, PK1 and PM2 and on the basis of the amplitude of the supplied IF signal. The control functions can also be called up from stored logic depending on the polarization cycle and according to a decision table stored in a suitable memory device.

Figure 2:
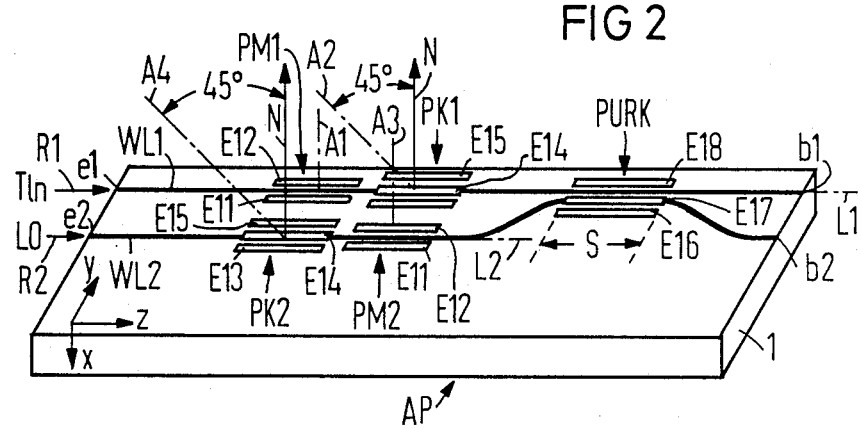
FIG. 2 is a perspective view of an integrated optical embodiment of the arrangement of FIG. 1.

FIG. 2 illustrates the integrated optical embodiment arrangement AP shown in FIG. 1 wherein the first and second waveguides WL1 and WL2 are comprised of strip waveguides which are integrated in the surface of a substrate 1 in the form of a lithium niobate crystal cut in the x-direction and the two waveguides WL1 and WL2 are arranged such that their longitudinal axes $L_1$ and $L_2$ are parallel to the optical crystal axis of the double refracting crystal and are parallel to the z-axis.

Each of the two phase modulators PM1 and PM2 are formed of two strip-shaped electrodes E11 and E12 which are arranged on both sides of the associated waveguide WL1 or, respectively WL2 and extend in the longitudinal axis direction of the waveguides.

The two electrodes E11 and E12 of each of the phase modulators PM1 and PM2 serve the purpose of supplying control voltages such that an electro-optically induced birefringence having an elliptical refractive index $A_1$ or, respectively, $A_3$ is induced in the associated waveguide WL1 or, respectively, WL2 and the elliptical refractive index axis extends parallel to the x-axis and, thus, parallel to the normal N of the surface of the substrate 1.

Each of the polarization converters PK1 and PK2 is composed of three strip-shaped electrodes E13, E14 and E15 which extend in the longitudinal axial direction relative to the particular waveguide WL1 or WL2 and two of the electrodes E13 and E15 are arranged on opposite sides of the associated waveguide and the third electrode E14 is mounted between the electrodes E13 and E15 above the associated waveguide WL1 or, respectively, WL2.

The three electrodes E13, E14 and E15 each of the polarization converters PK1, PK2 serve the purpose of applying control voltages to cause a birefringence having an elliptical refractive index $A_2$ or, respectively, $A_4$ can be induced electro-optically in the particular associated waveguide WL1 or, respectively WL2 and the elliptical refractive index axis has an angle of 45° with the normal N and lies in a plane perpendicular to the longitudinal axis $L_1$ or, respectively, $L_2$ of the associated waveguide WL1 or, respectively, WL2.

A polarization converter PK1 or, respectively, PK2 as described above is disclosed in the afore-mentioned publications of Thaniyavarn. Also discussed is the functional relationship between the control voltages which are to be applied and the polarization conversion is also discussed which can amount to nearly 100% in such a converter.

A phase-modulator as utilized in the embodiment of FIG. 2 is also discussed in the publication of Alferness.

The polarization independent optical directional coupler PURK can be constructed with the two waveguides WL1 and WL2 which are brought together at the output side of the arrangement AP such that they extend parallel to each other at such a slight distance from each other within a distance S that a radiation cross-over between the two waveguides occurs within the distance S1. Three strip-shaped electrodes E16, E17 and E18 are provided within the distance S for controlling the coupling ratio and the three electrodes E16, E17 and E18 extend parallel to the two waveguides WL1 and WL2 and two of the electrodes E16 and E18 are respectively arranged on the outside of the waveguides WL1 and WL2 and the third electrode E17 is mounted between the two waveguides WL1 and WL2 as illustrated in FIG. 2. The two outputs $b_1$ and $b_2$ of the directional coupler PURK occur at the end faces of the two waveguides WL1 and WL2 at the output end of the substrate. The inputs of the directional coupler are not real inputs and are not shown for this purposes of simplicity.

The two inputs $e_1$ and $e_2$ of the two waveguides WL1 and WL2 are formed by end faces of the waveguides at the input end of the substrate 1.

In a specific realization of the arrangement of FIG. 1, the differential half-wave voltage at the phase modulator PM1 and PM2 was about 40 volts assuming electrode length of 5 mm and an optical wavelength of 1.3 um, in other words, a relative phase shift of 0.9°/Vmm between the TE wave and the TM wave was achieved. The polarization converter which is a TE/TM converter has a conversion voltage of about 30 volts using a structural length of 8.5 mm. The structural length of the total arrangement comprising the two phase modulators PM1 and PM2 and the two polarization converters PK1 and PK2, i.e. without the directional coupler PURK was about 30 mm using the specified dimensions. With a directional coupler having a length of 10 mm and a radius of curvature of the waveguides of 30 mm the length of the overall arrangement of FIG. 2 is about 40 mm.

Advantages of an integrated optical arrangement such as shown in FIG. 2, may be seen from the absence of loss, short control times and the relatively power free control. Also, a monolithic integration on other electro-optical material such as for example InP is possible and the coupling ratio of the coupling means can be controlled.

Figure 3:
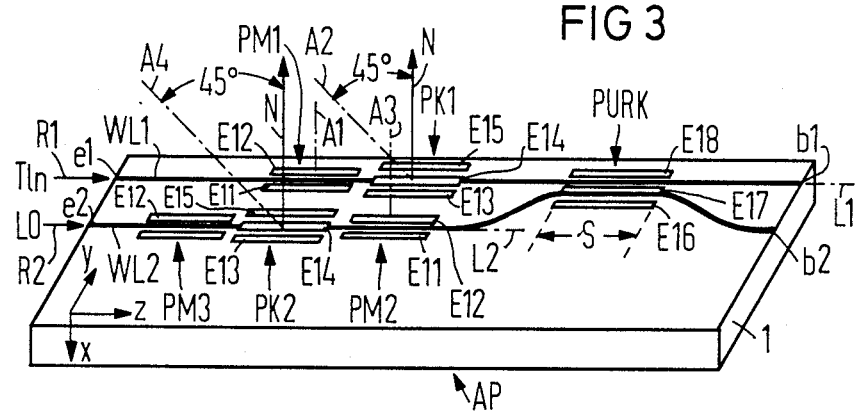
FIG. 3 illustrates a modification of the integrated optical arrangement of FIG. 2 and includes a third phase modulator.

FIG. 3 illustrates an integrated optical arrangement which differs from that shown in FIG. 2 only in that a third phase modulator PM3 is mounted between the inputs $e_2$ of the second waveguide WL2 and the second polarization converter PK2 and the further or third phase modulator PM3 is formed like the first and second phase modulators PM1 and PM2 having two electrodes E11 and E12 as shown.

Figure 4:
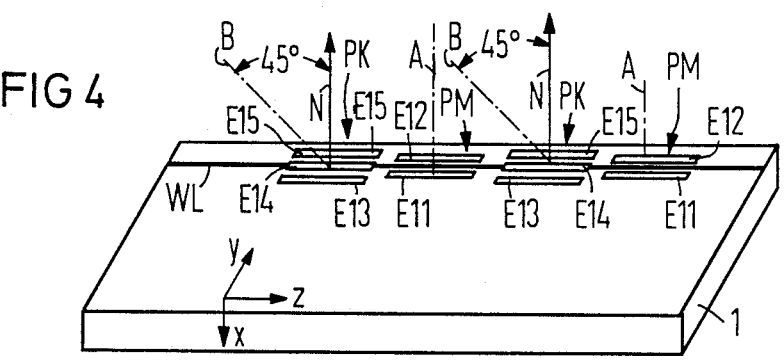
FIG. 4 is a perspective view of an integrated optical embodiment functioning according to the device described in the article by Noe which has two phase modulators and two polarization converters.

FIG. 4 is an integrated optical arrangement wherein a signal strip-shaped waveguide WL is integrated into the surface of the substrate of the lithium niobate crystal cut in the x-direction and the waveguide WL aligned parallel to the z-direction and thus, in the direction of the optical crystal axis. Two phase converters PK and two phase modulators PM are alternately arranged along the waveguide WL. The structure of each phase converter PK and each phase modulator PM corresponds to that of the phase converters PK1 and PK2 or, respectively, of the phase modulators PM1 and PM2 of those described in the arrangements of FIGS. 2 or 3. The elliptical refractive index B of each phase converter PK is aligned for example, like the elliptical refractive index axis A2 or A4 of a phase converter PK1 or, respectively, PK2 in the embodiment of FIG. 2 or FIG. 3. The elliptical refractive index axis of each phase modulator PM for example is aligned in the same manner as the elliptical refractive index axis A1 or A2 of a phase modulator PM1 or PM2 of the embodiments of FIGS. 2 and 3.

The arrangement of FIG. 4 corresponds to an electro-optically controllable arrangement as described in the article by Noe comprising four birefringent elements.

Figure 5:
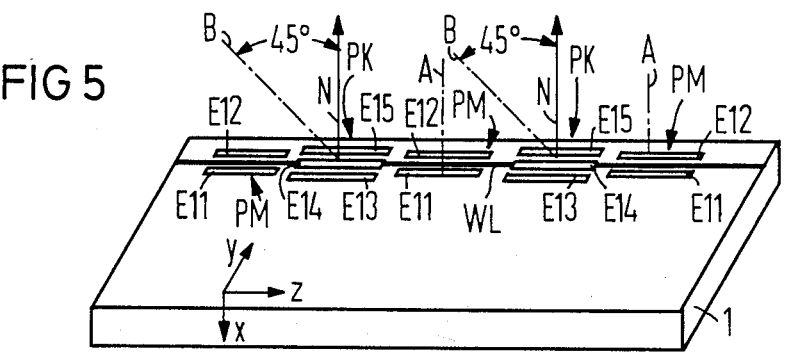
FIG. 5 is a perspective view of an integrated optical embodiment corresponding to the embodiment of FIG. 4 which has three phase modulators and two polarization converters.

FIG. 5 illustrates an integrated optical arrangement which differs from the arrangement of FIG. 4 only in that an additional phase modulator PM which is included and constructed in the same manner as the other phase modulators PM. In other words, FIG. 4 has two phase modulators PM which follow the polarization converters PK whereas in the embodiment of FIG. 5 there are three phase modulators with first modulator being arranged before the first polarization converter PK then a second phase modulator PM being between the first polarization converter PK and a second polarization converter PK; then a third phase modulator PM is arranged behind the output of the second polarization converter PK. Arrangement of FIG. 5 corresponds to an electro-optically controllable arrangement described in the article by Noe which comprises five double refracting elements.

The advantages of arrangements according to FIGS. 2, 3, 4 and 5 are: high yield in fabrication, short control times and low power control. Also, integration on other electrode optical materials is possible particularly on Inp.

The integrated-optical arrangement shown in FIG. 3 differs from the arrangement of FIG. 2 only in that a further phase modulator PM3 is arranged between the input $e_2$ of the other waveguide WL2 and the other polarization converter PK2, this further phase modulator PM3, just like the other phase modulators PM1 and PM2 being formed of the two electrodes E11 and E12.

In the integrated-optical arrangement of FIG. 4, a single strip-shaped waveguide WL is integrated into the surface of the substrate 1 of the lithium niobate crystal cut in x-direction, this waveguide WL proceeding in z-direction and, thus, in the direction of the optical crystal axis. Two phase converters PK and two phase modulators PM are arranged along this waveguide WL in alternating fashion. The structure of every phase converter PK and of every phase modulator PM corresponds to that of the phase converters PK1 and PK2 or, respectively, of the phase modulators PM1 and PM2 of the arrangement according to FIG. 2 or FIG. 3. The elliptical refractive index axis B of every phase converter PK is aligned, for example, like the elliptical refractive index axis A2 or A4 of a phase converter PK1 or, respectively, PK2 in the embodiment of FIG. 2 or FIG. 3. The elliptical refractive index axis of every phase modulator PM, for example, is aligned in the same way as the elliptical refractive index axis A1 or A2 of a phase modulator PM1 or PM2 of the embodiment of FIG. 2 or 3.

In a specific embodiment of an arrangement of FIG. 4, the waveguide WL is composed of Ti-doped strip waveguide which was fabricated by indiffusion of Ti stripes, for example, a Ti-stripe-thickness of 75 nm which is indiffused at 1040° C. during 6 hours and 25 minutes. The width of the strip waveguide WL was 8 μm. The two electrodes of each phase modulator PM were composed of two strips of gold 200 nm thick and 5 mm long which are laterally mounted adjacent to the strip waveguides WL. The three electrodes of each of the polarization converters PK are composed of gold strips 200 nm thick and 8.5 mm long. The electrodes E13 and E15 are arranged on both sides of the strip waveguide WL having a width of 50 μm and the other having a width of 100 μm. The third electrode E14 which is arranged above the strip waveguide WL has a width of 8 μm. The spacing of the electrodes E13 and E15 from the electrode E14 respectively is 5 μm.

Arrangements with regard to FIGS. 2, 3 and 5 may be fabricated accordingly.

Although the invention has been described with respect to preferred embodiments, it is not to be so limited as changes and modifications can be made which are within the full intended scope of the invention as defined by the appended claims.

We claim as our invention:

1. An arrangement for controlling polarization, particularly for an optical heterodyne or homodyne receiver, comprising: a first optical waveguide (WL1) which receives at an input ($e_1$) a polarized optical wave transmitted by a subscribed (Tln) which travels in a first direction, having a first phase modulator (PM1) mounted on said first waveguide (WL1) which provides a continuously controllable birefringence which has a fixed elliptical refractive index axis ($A_1$) which is aligned in the first waveguide (WL1) and, the phase of the input optical wave received from the subscriber (Tln) coupled into the first waveguide (WL1) is tunable with a first polarization converter (PK1) which receives the output of said first phase modulator (PM1) of the input optical wave received from the subscriber (Tln) which is coupled into the first waveguide (WL1), and a continuously controllable birefringence in said first waveguide (WL1) which is controlled by said first polarization converter (PK1) and said controllable birefringence having an elliptical refractive index axis ($A_2$) which is aligned at an angle of about 45° relative to the elliptical refractive index axis ($A_1$) of the first phase modulator (PM1), and as a result thereof, the state of polarization of said optical wave guided in said first waveguide (WL1) transformed into any arbitrary state of polarization of the output of said first polarization converter (PK1); a second optical waveguide (WL2) mounted parallel to and closely adjacent said first optical waveguide and receiving at an input ($e_2$) from a local oscillator (LO) a polarized optical wave which has an individual state of polarization, a second polarization converter (PK2) mounted onto said waveguide (WL2) that provides a continuously variable birefringence which has an elliptical refractive index axis ($A_4$) aligned at angle of about 45° relative to the fixed elliptical refractive index axis ($A_1$) of said first phase modulator (PM1) which is formed in said second waveguide (WL2) and with which a state of polarization which is orthogonal to the state of polarization of said optical wave generated by said local oscillator (LO) coupled into said second waveguide (WL2) is generated; and a second phase modulator (PM2) receiving the output of said second polarization converter (PK2) of the optical wave guided in said second waveguide (WL2), and said second phase modulator (PM2) provides a continuously variable birefringence which has an elliptical refractive index axis ($A_3$) which is aligned in parallel relative to the fixed elliptical refractive index axis ($A_1$) of said first phase modulator (PM1) which is formed in said second waveguide (WL2) and, as a result thereof, the state of polarization of said optical wave guided in said second waveguide (WL2) is transformed into any arbitrary state of polarization at the output of said second phase modulator (PM2), and wherein a polarization-independent, optical coupling means (PURK) receives the output of said first polarization converter (PK1) of the polarized optical wave received from the subscriber (Tln) coupled into said first waveguide (WL1) and the output of said second phase modulator (PM2) of the optical wave generated by said local oscillator (LO) coupled into said second waveguide (WL2) and both of said optical waves supplied to said optical coupling means for superposition, a pair of photo detectors which receive a pair of optical outputs from said optical coupling means (PURK), an electrical unit which receives inputs from said pair of photo detectors, and a polarization control which receives an output of said electronic unit and supplies outputs to said first and second phase modulators, said optical coupling means and said first and second polarization converters.

2. An arrangement according to claim 1, wherein said coupling means (PURK) is an optical directional coupler.

3. An arrangement according to claim 1 wherein said coupling means (PURK) has a coupling ratio which is controllable.

4. An arrangement for controlling polarization, particularly for an optical heterodyne or homodyne receiver, comprising: a first optical waveguide (WL1) which receives at an input ($e_1$) a polarized optical wave transmitted by a subscribed (Tln) which travels in a first direction, having a first phase modulator (PM1) mounted on said first waveguide (WL1) which provides continuously controllable birefringence which has a fixed elliptical refractive index axis ($A_1$) which is aligned in the first waveguide (WL1) and the phase of the input optical wave received from the subscriber (Tln) coupled into the first waveguide (WL1) is tunable with a first polarization converter (PK1) which receives the output of said first phase modulator (PM1) of the input optical wave received from the subscriber (Tln) which is coupled into the first waveguide (WL1), and a continuously controllable birefringence in said first waveguide (WL1) which is controlled by said first polarization converter (PK1) and said controllable birefringence having an elliptical refractive index axis ($A_2$) which is aligned at an angle of about 45° relative to the elliptical refractive index axis ($A_1$) of the first phase modulator (PM1), and as a result thereof, the state of polarization of said optical wave guided in said first waveguide (WL1) transformed into any arbitrary state of polarization of the output of said first polarization converter (PK1); a second output waveguide (WL2) mounted parallel to and closely adjacent to said first optical waveguide and receiving at an input ($e_2$) from a local oscillator (LO) a polarized optical wave which has an individual state of polarization, a second polarization converter (PK2) mounted onto said waveguide (WL2) that provides a continuously variable birefringence which has an elliptical refractive index axis ($A_4$) aligned at angle of about 45° relative to the fixed elliptical refractive index axis ($A_1$) of said first phase modulator (PM1) which is formed in said second waveguide (WL2) and with which a state of polarization which is orthogonal to the state of polarization of said optical wave generated by said local oscillator (LO) coupled into said second waveguide (WL2) is generated; and a second phase modulator (PM2) receiving the output of said second polarization converter (PK2) of the optical wave guided in said second waveguide (WL2), and said second phase modulator (PM2) provides a continuously variable birefringence which has an elliptical refractive index axis ($A_3$) which is aligned in parallel relative to the fixed elliptical refractive index axis ($A_1$) of said first phase modulator (PM1) which is formed in said second waveguide (WL2) and, as a result thereof, the state of polarization of said optical wave guided in said second waveguide (WL2) is transformed into any arbitrary state of polarization at the output of said second phase modulator (PM2), and wherein said first and second optical waveguides (WL1, WL2) are integrated on a substrate (1) of electro-optical material and every one of said first, second and third phase modulators (PM1; PM2, PM3) comprise an electrode pair (E11, E12) mounted onto said substrate (1) on either side of the associated first and second waveguides (WL1; WL2) to which are applied control voltage and every one of said first and second polarization converters (PK1; PK2) comprise three electrodes (E13, E14, E15) mounted on said substrate (1) to which are applied control voltages, two electrodes (E13, E15) thereof arranged on opposite sides of the associated waveguides (WL1; WL2) and the third electrode (E14) mounted between said two electrodes (E13, E15) on the associated waveguide (WL1; WL2), and wherein a coupling means (PURK) is integrated on the substrate (1).

5. An arrangement according to claim 4, wherein said first and second optical waveguides (WL1, WL2) are integrated on said substrate (1) and extend side by side at a slight distance from one another along a defined distance (S) between the outputs of said first polarization converter (PK1) and said second phase modulator (PM2) respectively, and the output of the arrangement (AP), said first and second waveguides (WL1, WL2) form an optical directional coupler (PURK) within said distance (s).

6. An arrangement according to claim 5, characterized in that at least three electrodes (E16, E17, E18) are provided for applying control voltages and being arranged on the substrate (1) within said defined distance (S), two electrodes (E16, E18) thereof being arranged on opposite sides of said first and second waveguides (WL1, WL2) and conducted side by side at a slight distance from one another and the third electrode (E17) is arranged between these two electrodes (E16, E18) between said first and second waveguides (WL1, WL2).

7. An arrangement for controlling polarization, particularly for an optical heterodyne or homodyne receiver, comprising: a first optical waveguide (WL1) which receives at an input ($e_1$) a polarized optical wave transmitted by a subscribed (Tln) which travels in a first direction, having a first phase modulator (PM1) mounted on said first waveguide (WL1) which provides a continuously controllable birefringence which has a fixed elliptical refractive index axis ($A_1$) which is aligned in the first waveguide (WL1) and the phase of the input optical wave received from the subscriber (Tln) coupled into the first waveguide (WL1) is tunable with a first polarization converter (PK1) which receives the output of said first phase modulator (PM1) of the input optical wave received from the subscriber (Tln) which is coupled into the first waveguide (WL1), and a continuously controllable birefringence in said first waveguide (WL1) which is controlled by said first polarization converter (PK1) and said controllable birefringence having an elliptical refractive index axis ($A_2$) which is aligned at an angle of about 45° relative to the elliptical refractive index axis ($A_1$) of the first phase modulator (PM1), and as a result thereof, the state of polarization of said optical wave guided in said first waveguide (WL1) transformed into any arbitrary state of polarization of the output of said first polarization converter (PK1); a second output waveguide (WL2) mounted parallel to and closely adjacent to said first optical waveguide and receiving at an input ($e_2$) from a local oscillator (LO) a polarized optical wave which has an individual state of polarization, a second polarization converter (PK2) mounted onto said waveguide (WL2) that provides a continuously variable birefringence which has an elliptical refractive index axis ($A_4$) aligned at angle of about 45° relative to the fixed elliptical refractive index axis ($A_1$) of said first phase modulator (PM1) which is formed in said second waveguide (WL2) and with which a state of polarization which is orthogonal to the state of polarization of said optical wave generated by said local oscillator (LO) coupled into said second waveguide (WL2) is generated; and a second phase modulator (PM2) receiving the output of said second polarization converter (PK2) of the optical wave guided in said second waveguide (WL2), and said second phase modulator (PM2) provides a continuously variable birefringence which has an elliptical refractive index axis ($A_3$) which is aligned in parallel relative to the fixed elliptical refractive index axis ($A_1$) of said first phase modulator (PM1) which is formed in said second waveguide (WL2) and, as a result thereof, the state of polarization of said optical wave guided in said second waveguide (WL2) is transformed into any arbitrary state of polarization at the output of said second phase modulator (PM2), and wherein said first and second optical waveguides (WL1, WL2) are integrated on a substrate (1) of electro-optical material and every one of said first, second and third phase modulators (PM1; PM2, PM3) comprise an electrode pair (E11, E12) mounted onto said substrate (1) on either side of the associated first and second waveguides (WL1; WL2) to which control voltages are applied and every one of said first and second polarization converters (PK1; PK2) comprise three electrodes (E13, E14, E15) mounted on said substrate (1) to which are applied control voltages, two electrodes (E13, E15) thereof arranged on opposite sides of the associated waveguides (WL1; WL2) and the third electrode (E14) being mounted between said two electrodes (E13, E15) on the associated waveguide (WL1; WL2), and wherein said substrate (1) is formed of a lithium niobate crystal cut in a defined direction (x-direction) perpendicular to its optical crystal axis (z-axis) on which said first and second waveguides (WL1, WL2) are integrated such that their longitudinal direction in the regions of said first and second phase converters (PK1, PK2) and said first, second and third phase modulators (PM1; PM2, PM3) and, thus, the propagation directions (R1, R2) of the optical waves received from the subscriber (Tln) and the local oscillator (LO) and which are coupled into said first and second waveguides (WL1, WL2), respectively, proceed in the direction of the optical crystal axis (z-axis) of said birefringent crystal in this region.

* * * * *